Sept. 6, 1949.                    C. WATERS                    2,481,182
                                 HOG SCRAPER
                              Filed May 14, 1945
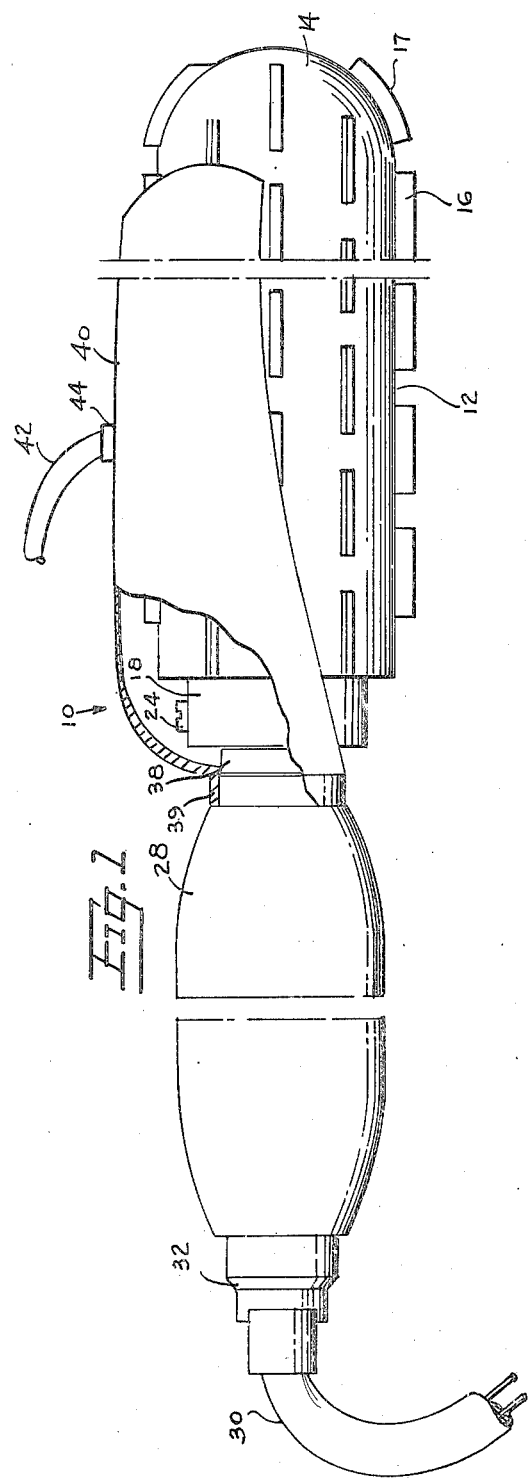
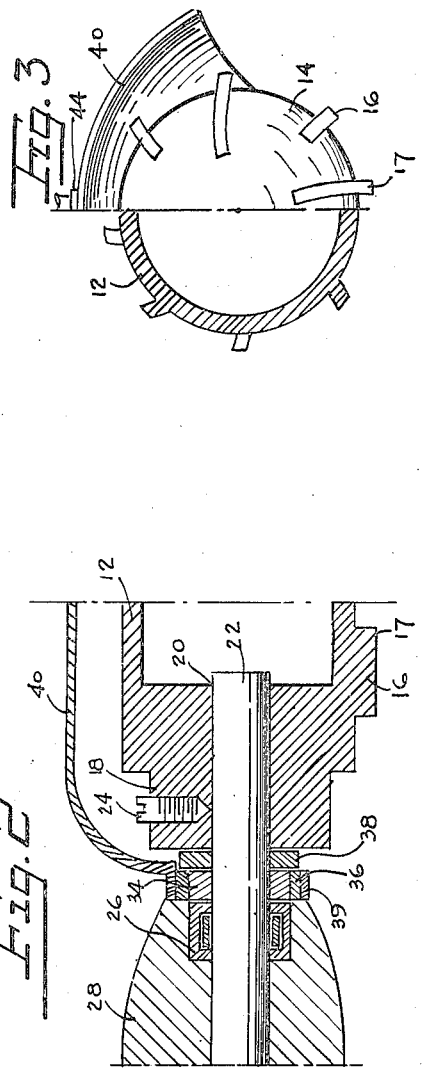
INVENTOR.
CECIL WATERS
BY *Victor J. Evans & Co.*
ATTORNEYS Patented Sept. 6, 1949

2,481,182

UNITED STATES PATENT OFFICE 2,481,182

HOG SCRAPER

Cecil Waters, Manhattan, Mont.

Application May 14, 1945, Serial No. 593,680

1 Claim. (Cl. 17—19)

This invention relates to a hog scraper which is power driven and adapted to be used for processing hogs after the hogs have been slaughtered.

An object of the invention is to provide a device that will quickly and efficiently remove the hairs from the scalded carcass of a slaughtered hog.

With this and other objects and advantages in view the invention comprises certain novel combinations, constructions and arrangements of parts as will be hereinafter described, illustrated in the accompanying drawings and more particularly pointed out in the appended claim.

In the drawing:

Fig. 1 is a side elevation of an embodiment of the invention.

Fig. 2 is a detailed sectional view, and

Fig. 3 is a front view partly in elevation and partly in section.

Referring more in detail to the drawing the hog scraper in its entirety is generally designated by the numeral 10.

The hog scraper 10 comprises a hollow cylindrical scraper head 12 which is made from steel or any other suitable material.

The forward end 14 of the head 12 is rounded to permit access to depressions in the scalded carcass which are impossible to get to with the flat surface of the head 12.

The outer surface of the head 12 is provided with parallel rows of arcuate teeth 16. The teeth are made of hardened steel having the scraping end 17 sharpened and the teeth may be made integral with the head or may be removeably inserted in slots formed in the head 12. The teeth 16 on the forward end 14 of the head 12 follows the contour of the rounded end to a position near the center thereof.

The head 12 is provided with a reduced rear portion 18 which is provided with a drive shaft receiving opening 20 to receive the drive shaft 22 therein, the head 12 being secured to the drive shaft 22 by means of a set screw 24 in the reduced portion 18.

The drive shaft 22 is made of hardened steel and is journalled in needle bearings 26 or the like in opposite ends of an elliptical shaped hardwood handle 28. The shaft 22 extends through the handle 28 and is connected to a flexible drive shaft 30 at its outer end by means of connection 32. The shaft 30 being adapted to be connected to a source of power not shown for rotating the head 12.

The bearings 26 are retained in the handle 28 by means of a steel insert 34 positioned in the reduced portion 36 of the handle 28.

A steel spacer 38 is positioned on the shaft 30 intermediate the reduced portion 18 of the head 12 and the reduced portion 36 of the handle 28 to prevent binding of the scraper head during rotation thereof.

Secured to the reduced portion 36 of the handle 28 is the integral circular ring portion 39 of a convexo-concave guard 40 to which is connected a flexible water hose 42 by means of a hose connection 44. The hose 42 carries water to and disperses it over the head 12 to keep it clean from hairs scraped from the slaughtered hog.

It will be apparent to those skilled in the art that there has been provided a hog scraper that is simple, efficient and will permit its operation in an expeditious manner, also that the scraper head will be kept clean at all times by means of water which is dispersed over the head during the operation of the scraper.

The embodiment of the invention herein disclosed, therefore, accomplishes the objects of the invention and possesses other advantages than those herein particularly referred to. It is to be further understood that various changes and modifications may be made without departing from the spirit of the invention, and since the embodiment disclosed herein being only illustrative of the device, the invention is not to be understood as restricted thereto, since this may be modified within the scope of the appended claims without departing from the spirit or scope of the invention.

Having thus described the invention, what is claimed as new and desired to be secured by Letters Patent is:

A device of the character described comprising a cylindrical hollow scraper head having a rounded forward end, parallel rows of teeth on the outer circumference thereof, the teeth on the rounded forward end of said head conform to and follow the contour thereof to a position near the center thereof, and the teeth on the outer longitudinal surface thereof being arcuate in cross section and relatively spaced from each other, a handle connected to said head, a reduced portion on said head, a convexoconcave guard for said head having a ring formed integral therewith for mounting said guard on the reduced portion of said handle, means at the center top surface of said guard for connecting a water supply hose thereto, and means journalled in a handle for rotating said head.

CECIL WATERS.

REFERENCES CITED

The following references are of record in the file of this patent:

UNITED STATES PATENTS

| Number | Name | Date |
| --- | --- | --- |
| 663,561 | Constantine | Dec. 11, 1900 |
| 1,642,802 | Barry | Sept. 20, 1927 |
| 1,865,492 | Wernberg | July 5, 1932 |
| 1,982,084 | Strand | Nov. 27, 1934 |

FOREIGN PATENTS

| Number | Country | Date |
| --- | --- | --- |
| 753,355 | France | Oct. 14, 1933 |